US012659385B2

(12) United States Patent (10) Patent No.: US 12,659,385 B2
Ryu et al. (45) Date of Patent: Jun. 16, 2026

(54) NON-IP HEADER COMPRESSION IN BROADCAST SIDELINK COMMUNICATION

(71) Applicant: Huawei Technologies Co., Ltd., Shenzhen (CN)

(72) Inventors: Kiseon Ryu, Lund (SE); Taimoor Abbas, Lund (SE); Gustaf Claeson, Lund (SE); Rama Kumar Mopidevi, Lund (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 547 days.

(21) Appl. No.: 18/298,835

(22) Filed: Apr. 11, 2023

(65) Prior Publication Data

US 2023/0247112 A1 Aug. 3, 2023

Related U.S. Application Data

(63) Continuation of application No. PCT/EP2020/078553, filed on Oct. 12, 2020.

(51) Int. Cl.
H04L 69/04 (2022.01)
H04W 92/18 (2009.01)

(52) U.S. Cl.
CPC ............. H04L 69/04 (2013.01); H04W 92/18 (2013.01)

(58) Field of Classification Search
CPC ........ H04L 69/04; H04L 67/12; H04W 92/18; H04W 4/40; H04W 76/40; H04W 76/14
See application file for complete search history.

(56) References Cited

U.S. PATENT DOCUMENTS

| | | | | |
|---|---|---|---|---|
| 2012/0155375 A1* | 6/2012 | Zhu | .......................... | H04L 69/04 |
| | | | | 370/315 |
| 2018/0007545 A1* | 1/2018 | Lee | ........................ | H04W 8/245 |
| 2018/0368196 A1* | 12/2018 | Gage | ................... | H04L 63/0428 |
| 2019/0059128 A1* | 2/2019 | Gage | .................... | H04W 12/04 |
| 2020/0107169 A1* | 4/2020 | Chin | ................... | H04L 61/5038 |
| 2021/0058497 A1* | 2/2021 | Pan | .......................... | H04L 69/04 |
| 2022/0303821 A1* | 9/2022 | Kang | ................ | H04W 28/0278 |

OTHER PUBLICATIONS

3rd Generation Partnership Project; Technical Specification Group Radio Access Network; NR; Packet Data Convergence Protocol (PDCP) specification (Release 16). 3GPP TS 38.323 V16.2.0 (Sep. 2020). total 40 pages.

(Continued)

*Primary Examiner* — Abdullahi E Salad
(74) *Attorney, Agent, or Firm* — Slater Matsil, LLP

(57) ABSTRACT

A first client device compresses a broadcast sidelink packet according to a configuration for a compression profile by removing at least one non-IP header of the broadcast sidelink packet. The first client device transmits the compressed broadcast sidelink packet together with an indication of the compression profile. When a second client device receives the compressed broadcast sidelink packet, the second client device reconstructs the at least one non-IP header of the broadcast sidelink packet based on the configuration for the compression profile and the indicated compression profile.

20 Claims, 4 Drawing Sheets

(56) References Cited

OTHER PUBLICATIONS

3rd Generation Partnership Project; Technical Specification Group Core Network and Terminals; Vehicle-to-Everything (V2X) services in 5G System (5GS); Stage 3 (Release 16). 3GPP TS 24.587 V16.2.1 (Sep. 2020). total 105 pages.

3rd Generation Partnership Project; Technical Specification Group Core Network and Terminals; Vehicle-to-Everything (V2X) services in 5G System (5GS); User Equipment (UE) policies; Stage 3 (Release 16). 3GPP TS 24.588 V16.2.0 (Sep. 2020). total 67 pages.

Intelligent Transport Systems (ITS); Vehicular Communications; Basic Set of Applications; Part 2: Specification of Cooperative Awareness Basic Service. ETSI EN 302 637-2 V1.4.1 (Apr. 2019). total 45 pages.

Intelligent Transport Systems (ITS); Vehicular Communications; GeoNetworking; Part 4: Geographical addressing and forwarding for point-to-point and point-to-multipoint communications; Sub-part 1: Media-Independent Functionality. ETSI EN 302 636-4-1 V1.3.1 (Aug. 2017). total 97 pages.

Intelligent Transport Systems (ITS); Vehicular Communications; GeoNetworking; Part 5: Transport Protocols; Sub-part 1: Basic Transport Protocol. ETSI EN 302 636-5-1 V2.2.1 (May 2019). total 18 pages.

Intelligent Transport Systems (ITS); GeoNetworking; Port Nos. for the Basic Transport Protocol (BTP); Release 2. ETSI TS 103 248 V2.2.1 (Nov. 2022). total 7 pages.

Intelligent Transport System (ITS); Vulnerable Road Users (VRU) awareness; Part 2: Functional Architecture and Requirements definition; Release 2. ETSI TS 103 300-2 V2.1.1 (May 2020). total 71 pages.

IEEE Computer Society: "IEEE Standard for Information technology—Telecommunications and information exchange between systems—Local and metropolitan area networks—Specific requirements." IEEE STD 802.11p™—2010. Jul. 15, 2010. total 51 pages.

IEEE Vehicular Technology Society:"IEEE Standard for Wireless Access in Vehicular Environments (WAVE)—Networking Services." IEEE 3 Park Avenue New York, NY 10016-5997 USA IEEE Std 1609.3™—2016 (Revision of IEEE Std 1609.3-2010). Jan. 29, 2016. total 160 pages.

C. Bormann et al:"RObust Header Compression (ROHC): Framework and four profiles: RTP, UDP, ESP, and uncompressed." Jul. 2001. total 168 pages.

M. Degermark et al:"IP Header Compression." Feb. 1999. total 47 pages.

* cited by examiner

100

200

300

400

NON-IP HEADER COMPRESSION IN BROADCAST SIDELINK COMMUNICATION

CROSS-REFERENCE TO RELATED APPLICATIONS

This application is a continuation of International Application No. PCT/EP2020/078553, filed on Oct. 12, 2020, the disclosure of which is hereby incorporated by reference in its entirety.

TECHNICAL FIELD

The invention relates to non-IP header compression in broadcast sidelink communication between client devices. Furthermore, the invention also relates to corresponding methods and a computer program.

BACKGROUND

The general concept of header compression can be described as avoiding sending header fields that do not change between consecutive packets. Header compression (RFC2507) was introduced in the packet data convergence protocol (PDCP) layer in 3GPP Rel-99. However, it was not used in practice as the header size represented a very small size compared to the payload. For example, in a packet data connection, payload for a typical transmission control protocol (TCP)/internet protocol (IP) session is 1420 bytes and the header is 40 bytes.

Robust header compression (RoHC), based on RFC3095, was introduced to support voice over IP (VoIP) services. RoHC can reduce real-time transport protocol (RTP)/user datagram protocol (UDP)/IP headers from 40/60 bytes to 1 to 3 bytes. RoHC was the only header compression scheme supported in long term evolution (LTE). More RoHC profiles were added in LTE compared to wideband code division multiple access (WCDMA).

Ethernet header compression (EHC) was introduced in 3GPP Rel-16 to support industrial internet of things (IIoT) services. EHC is being fully developed by 3GPP and can reduce Ethernet headers from 18 bytes to 1 to 5 bytes.

SUMMARY

An objective of embodiments of the invention is to provide a solution which mitigates or solves the drawbacks and problems of conventional solutions.

The above and further objectives are solved by the subject matter of the independent claims. Further advantageous embodiments of the invention can be found in the dependent claims.

According to a first aspect of the invention, the above mentioned and other objectives are achieved with a first client device for a sidelink communication system, the first client device being configured to: obtain a configuration for a compression profile; compress a broadcast sidelink packet according to the configuration for the compression profile by removing at least one non-IP header of the broadcast sidelink packet when the at least one non-IP header matches the configuration for the compression profile; and transmit the compressed broadcast sidelink packet and an indication of the compression profile.

Sidelink communication can herein be understood to mean direct communication between client devices without going through a network access node. The sidelink communication may be performed over an interface such as e.g. a PC5 interface as defined in the 3GPP standard.

An advantage of the first client device according to the first aspect is that the overall system capacity can be improved by the first client device removing the non-IP headers from the broadcast sidelink packet for transmission.

In an implementation form of a first client device according to the first aspect, the configuration for the compression profile comprises at least one of: a vehicle-to-everything, V2X, layer header configuration, a network layer header configuration, or a transport layer header configuration.

The V2X layer can herein be the V2X layer as defined in 3GPP TS 23.287 and the V2X layer header may correspond to a V2X envelop.

An advantage with this implementation form is that the first client device is provided the configuration for the compression profile to compress the non-IP headers such as the V2X layer header, the network layer header, and the transport layer header in the broadcast sidelink packet.

In an implementation form of a first client device according to the first aspect, the at least one non-IP header matches the configuration for the compression profile when the at least one non-IP header and the configuration for the compression profile have a same value.

An advantage with this implementation form is that the first client device can simply determine whether or not to compress the non-IP headers of the broadcast sidelink packet by comparing the non-IP header fields and the configuration for the compression profile.

In an implementation form of a first client device according to the first aspect, the first client device is further configured to: compress the broadcast sidelink packet in a packet data convergence protocol, PDCP, layer; and indicate the compression profile in a PDCP header associated with the compressed broadcast sidelink packet.

An advantage with this implementation form is that the gain of non-IP header compression can be maximized by removing the V2X layer header, the network layer header, and the transport layer header at the PDCP layer.

In an implementation form of a first client device according to the first aspect, the first client device is further configured to: compress the broadcast sidelink packet in a V2X layer; and indicate the compression profile in a V2X layer header associated with the compressed broadcast sidelink packet.

An advantage with this implementation form is that non-IP header compression can be implemented with limited specification impact and low complexity at the V2X layer which controls the quality of service flow for a V2X service.

In an implementation form of a first client device according to the first aspect, the at least one non-IP header is any of a V2X layer header, a GeoNetworking header, a basic transport protocol, BTP, header and a WAVE short message protocol, WSMP, header.

An advantage with this implementation form is that non-IP header compression can be implemented with low complexity by defining the type of non-IP headers for compression.

In an implementation form of a first client device according to the first aspect, the compression profile comprises information about at least one of a protocol and a V2X message type.

An advantage with this implementation form is that it allows the first client device to indicate non-IP header compression by the compression profile which is based on at least one of a protocol, and a V2X message type.

In an implementation form of a first client device according to the first aspect, the protocol is at least one of ETSI-ITS and IEEE 1609; and the V2X message type is at least one of coordinate awareness message, CAM, vulnerable road user awareness message, VAM, basic safety message, BSM, and personal safety message, PSM.

An advantage with this implementation form is that non-IP header compression can be implemented for a V2X service which is based on any of the EU standard and the US standard.

In an implementation form of a first client device according to the first aspect, obtain the configuration for the compression profile comprises at least one of: obtain the configuration for the compression profile from received policy delivery service signaling; obtain the configuration for the compression profile from received control signaling; and obtain the configuration for the compression profile from a memory or a USIM.

An advantage with this implementation form is that the first client device is provided implementation flexibility on how to obtain the configuration for the compression profile.

In an implementation form of a first client device according to the first aspect, the first client device is further configured to at least one of: start compress a broadcast sidelink packet according to a configuration for a compression profile after reception of an activation signal; and stop compress a broadcast sidelink packet after reception of a deactivation signal.

An advantage with this implementation form is that backward compatibility for non-IP header compression of the broadcast sidelink packet can be supported.

According to a second aspect of the invention, the above mentioned and other objectives are achieved with a second client device for a sidelink communication system, the second client device being configured to: obtain a configuration for a compression profile; receive a broadcast sidelink packet and an indication of the compression profile associated with the broadcast sidelink packet; and reconstruct at least one non-IP header of the broadcast sidelink packet according to the configuration for the compression profile and the indicated compression profile.

An advantage of the second client device according to the second aspect is that the overall system capacity can be improved by the second client device reconstructing the non-IP headers, which has been removed by the first client device for transmission, without losing any information of the broadcast sidelink packet.

In an implementation form of a second client device according to the second aspect, the configuration for the compression profile comprises at least one of: a V2X layer header configuration, a network layer header configuration, or a transport layer header configuration.

An advantage with this implementation form is that the second client device is provided the configuration for the compression profile to reconstruct the non-IP headers, which has been removed by the first client device for transmission, such as the V2X layer header, the network layer header, and the transport layer header.

In an implementation form of a second client device according to the second aspect, the second client device is further configured to: receive the indication of the compression profile in a PDCP header associated with the broadcast sidelink packet; and reconstruct the at least one non-IP header in a PDCP layer.

An advantage with this implementation form is that the gain of non-IP header compression can be maximized by the second client device reconstructing the V2X layer header, the network layer header, and the transport layer header at the PDCP layer.

In an implementation form of a second client device according to the second aspect, the second client device further configured to: receive the indication of the compression profile in a V2X layer; and reconstruct the at least one non-IP header in a V2X layer.

An advantage with this implementation form is that non-IP header compression can be implemented with limited specification impact and low complexity at the V2X layer which controls the quality of service flow for a V2X service.

In an implementation form of a second client device according to the second aspect, the at least one non-IP header is any of a V2X layer header, a GeoNetworking header, a BTP header and a WSMP header.

An advantage with this implementation form is that non-IP header compression can be implemented with low complexity by defining the type of non-IP headers for compression.

In an implementation form of a second client device according to the second aspect, the indicated compression profile comprises information about at least one of a protocol and a V2X message type.

An advantage with this implementation form is that it allows the second client device to reconstruct the non-IP headers based on the indicated compression profile comprising at least one of the protocol, and the V2X message type.

In an implementation form of a second client device according to the second aspect, the protocol is at least one of ETSI-ITS and IEEE 1609; and the V2X message type is at least one of CAM, VAM, BSM and PSM.

An advantage with this implementation form is that non-IP header compression can be supported for a V2X service which is based on any of the EU standard and the US standard.

In an implementation form of a second client device according to the second aspect, obtain the configuration comprises at least one of: obtain the configuration for the compression profile from received policy delivery service signaling; obtain the configuration for the compression profile from received control signaling; and obtain the configuration for the compression profile from a memory or a USIM.

An advantage with this implementation form is that the second client device is provided implementation flexibility on how to obtain the configuration for the compression profile.

According to a third aspect of the invention, the above mentioned and other objectives are achieved with a method for a first client device, the method comprises obtaining a configuration for a compression profile; compressing a broadcast sidelink packet according to the configuration for the compression profile by removing at least one non-IP header of the broadcast sidelink packet when the at least one non-IP header matches the configuration for the compression profile; and transmitting the compressed broadcast sidelink packet and an indication of the compression profile.

The method according to the third aspect can be extended into implementation forms corresponding to the implementation forms of the first client device according to the first aspect. Hence, an implementation form of the method comprises the features of the corresponding implementation form of the first client device.

The advantages of the methods according to the third aspect are the same as those for the corresponding implementation forms of the first client device according to the first aspect.

According to a fourth aspect of the invention, the above mentioned and other objectives are achieved with a method for a second client device, the method comprises: obtaining a configuration for a compression profile; receiving a broadcast sidelink packet and an indication of the compression profile associated with the broadcast sidelink packet; and reconstructing at least one non-IP header of the broadcast sidelink packet according to the configuration for the compression profile and the indicated compression profile.

The method according to the fourth aspect can be extended into implementation forms corresponding to the implementation forms of the second client device according to the second aspect. Hence, an implementation form of the method comprises the features of the corresponding implementation form of the second client device.

The advantages of the methods according to the fourth aspect are the same as those for the corresponding implementation forms of the second client device according to the second aspect.

The invention also relates to a computer program, characterized in program code, which when run by at least one processor causes said at least one processor to execute any method according to embodiments of the invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the invention will be apparent from the following detailed description.

BRIEF DESCRIPTION OF THE DRAWINGS

The appended drawings are intended to clarify and explain different embodiments of the invention, in which.

DETAILED DESCRIPTION OF ILLUSTRATIVE EMBODIMENTS

Figure 1:
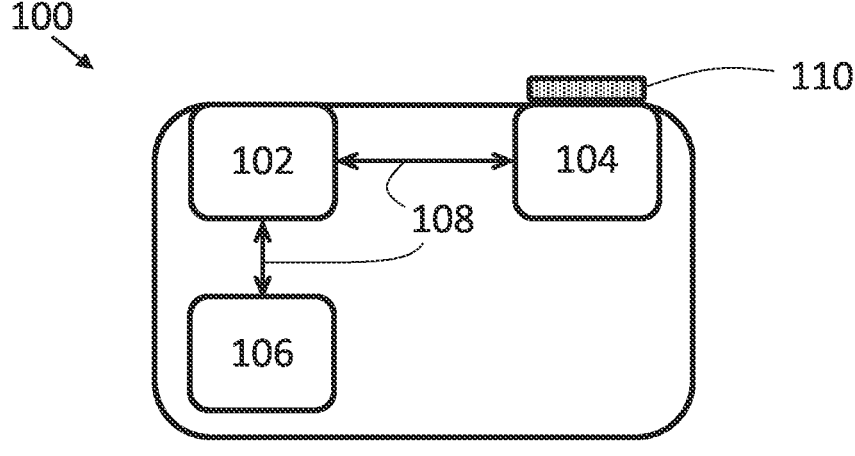
FIG. 1 shows a first client device according to an embodiment of the invention.

Vehicle-to-everything (V2X) communication is one safety feature that establishes communication among various entities on roads for co-operative safety. V2X involves communication between Vehicle-to-vehicle (V2V), Vehicle-to-infrastructure (V2I), and Vehicle-to-pedestrian (V2P). V2P is an umbrella term that encompasses the communication between vehicles and all types of vulnerable road users (VRUs). By enabling V2P for VRUs, the VRUs can become an active part of the intelligent transport system (ITS) and can enable various safety and convenience ITS applications.

The full potential of V2X systems can be exploited if at least 80% of the road users are connected. Therefore, in future more and more actors in the traffic will be connected and use spectrum resources for V2X messages. For example, VRUs, such as e.g. pedestrians and bicyclists, will be connected and periodically broadcast V2X messages, e.g. VRU awareness messages (VAMs) in EU and pedestrian safety messages (PSM) in US. Vehicles also periodically broadcast V2X messages, e.g. coordinate awareness messages (CAMs) or basic safety messages (BSMs), and occasional decentralized environmental notification messages (DENMs). Hence, an increase in use of spectrum resources is expected.

The cellular V2X protocol stack consists of service and application layer, network/transport layer, and access layer. The service and application layer is specified by ETSI for the EU protocol stack and by SAE international for the US protocol stack. The network/transport layer can be implemented with two options which are IP pathway and non-IP pathway. The non-IP pathway is configured with GeoNetworking and basic transport protocol (BTP) defined in ETSI specification for the EU protocol stack, or WAVE short message protocol (WSMP) defined in IEEE specification for the US protocol stack. The access layer is defined in 3GPP standard for LTE cellular V2X and 5G new radio V2X. V2X security layer and V2X management layer are vertical layers, interlinked with all other layers and specified at 3GPP, ETSI, IEEE, and SAE based on its relevant layer in the protocol stack.

The current non-IP based broadcast V2X packets contains non-IP header fields which are not meaningful for cellular V2X. In the EU protocol stack, the V2X service and application layer specification defines the default configuration for the lower layer headers, i.e. GeoNetworking and BTP headers. However, most GeoNetworking header fields are not meaningful for cellular V2X, as GeoNetworking is optimized for multi-hop communication over the ITS-G5 access layer which is based on IEEE802.11p. In the US protocol stack, the V2X service and application layer specification and WAVE protocol rely on WSMP protocol for network and transport layers. However, most WSMP header fields are not meaningful for cellular V2X as they are specified mainly for WAVE.

An objective of the invention is to provide a mechanism where non-IP headers which are not meaningful can be removed from a broadcast sidelink packet. According to embodiments of the invention a configuration for a compression profile is therefore introduced. The configuration for the compression profile allows a transmitting client device to compress a broadcast sidelink packet by removing a non-IP header and a receiving client device to reconstruct the non-IP header of the received broadcast sidelink packet. In this way, broadcast sidelink packets can be shortened such that transmission resources can be saved and the overall system capacity can be improved.

FIG. 1 shows a first client device 100 according to an embodiment of the invention. In the embodiment shown in FIG. 1, the first client device 100 comprises a processor 102, a transceiver 104 and a memory 106. The processor 102 may be coupled to the transceiver 104 and the memory 106 by communication means 108 known in the art. The first client device 100 may further comprise an antenna or antenna array 110 coupled to the transceiver 104, which means that the first client device 100 may be configured for communications in a wireless communication system such as e.g. the sidelink communication system 500 shown in FIG. 5.

That the first client device 100 may be configured to perform certain actions can in this disclosure be understood to mean that the first client device 100 comprises suitable means, such as e.g. the processor 102 and the transceiver 104, configured to perform said actions.

According to embodiments of the invention the first client device 100 is configured to obtain a configuration for a compression profile and compress a broadcast sidelink packet according to the configuration for the compression profile by removing at least one non-IP header of the broadcast sidelink packet when the at least one non-IP header matches the configuration for the compression profile. The first client device 100 is further configured to transmit the compressed broadcast sidelink packet 510 and an indication of the compression profile.

Figure 2:
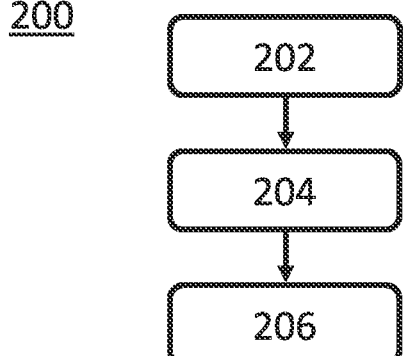
FIG. 2 shows a method for a first client device according to an embodiment of the invention.

FIG. 2 shows a flow chart of a corresponding method 200 which may be executed in a first client device 100, such as the one shown in FIG. 1. The method 200 comprises obtaining 202 a configuration for a compression profile and compressing 204 a broadcast sidelink packet according to the configuration for the compression profile by removing at least one non-IP header of the broadcast sidelink packet when the at least one non-IP header matches the configuration for the compression profile. The method 200 further comprises transmitting 206 the compressed broadcast sidelink packet 510 and an indication of the compression profile.

Figure 3:
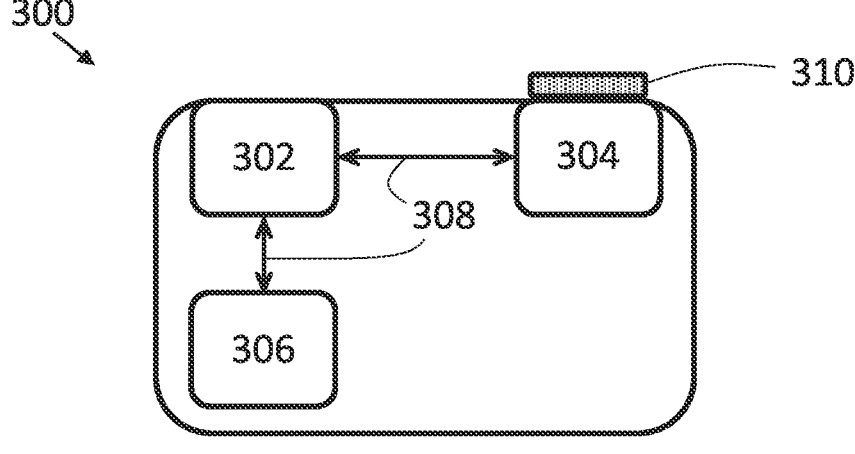
FIG. 3 shows a second client device according to an embodiment of the invention.

FIG. 3 shows a second client device 300 according to an embodiment of the invention. In the embodiment shown in FIG. 3, the second client device 300 comprises a processor 302, a transceiver 304 and a memory 306. The processor 302 is coupled to the transceiver 304 and the memory 306 by communication means 308 known in the art. The second client device 300 may further comprise an antenna or antenna array 310 coupled to the transceiver 304, which means that the second client device 300 may be configured for communications in a wireless communication system such as e.g. the sidelink communication system 500 shown in FIG. 5.

That the second client device 300 is configured to perform certain actions can in this disclosure be understood to mean that the second client device 300 comprises suitable means, such as e.g. the processor 302 and the transceiver 304, configured to perform said actions.

According to embodiments of the invention the second client device 300 is configured to obtain a configuration for a compression profile. The second client device 300 is further configured to receive a broadcast sidelink packet 510 and an indication of the compression profile associated with the broadcast sidelink packet 510; and reconstruct at least one non-IP header of the broadcast sidelink packet 510 according to the configuration for the compression profile and the indicated compression profile.

Figure 4:
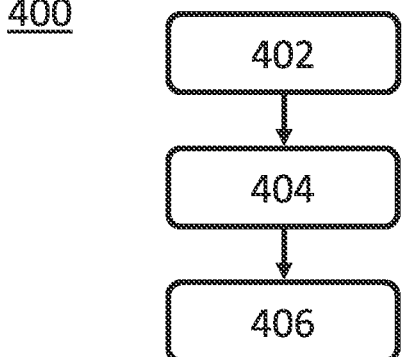
FIG. 4 shows a method for a second client device according to an embodiment of the invention.

FIG. 4 shows a flow chart of a corresponding method 400 which may be executed in a second client device 300, such as the one shown in FIG. 3. The method 400 comprises obtaining 402 a configuration for a compression profile. The method 400 further comprises receiving 404 a broadcast sidelink packet 510 and an indication of the compression profile associated with the broadcast sidelink packet 510; and reconstructing 406 at least one non-IP header of the broadcast sidelink packet 510 according to the configuration for the compression profile and the indicated compression profile.

Figure 5:
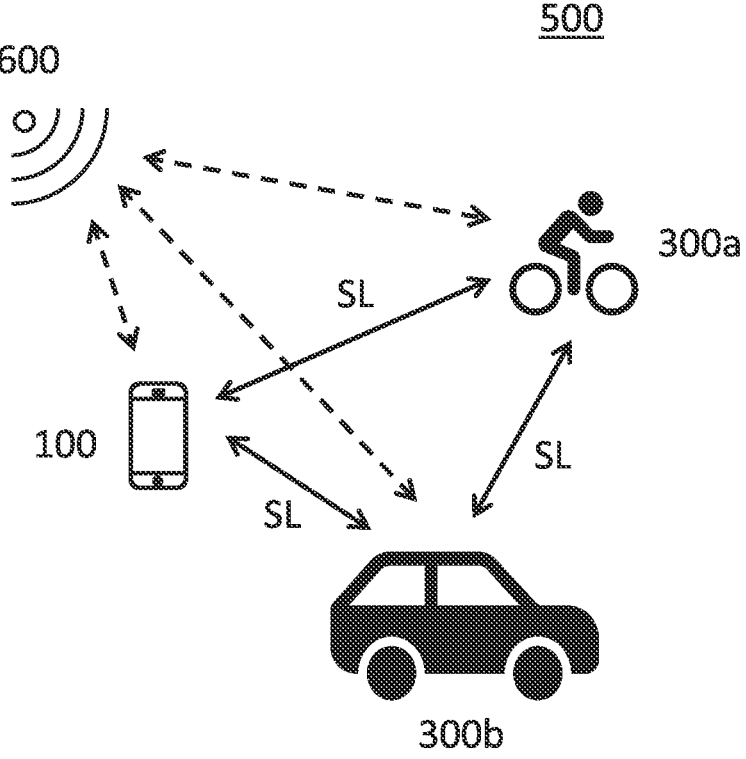
FIG. 5 shows a sidelink communication system according to an embodiment of the invention.

FIG. 5 shows a sidelink communication system 500 according to an embodiment of the invention. In the embodiment shown in FIG. 5, the sidelink communication system 500 comprises a network access node 600, a first client device 100, and two second client devices 300a, 300b. The first client device 100 may be configured for sidelink communication with one or more second client device 300 over sidelinks SLs. The sidelink communication may be of different types such as broadcast, unicast or groupcast sidelink communication. The first client device 100 and two second client devices 300a, 300b may further be configured for wireless communication with the network access node 600 which may e.g. be a base station or a road side unit.

In embodiments, the sidelink communication system 500 can be based on NR or LTE radio access technology (RAT) and the sidelink communication may be performed over an interface such as e.g. a PC5 interface as defined in the 3GPP standard. The sidelink communication may e.g. be V2X communication between the first client device 100 and two second client devices 300a, 300b used to exchange V2X messages for safety applications or similar.

Figure 6:
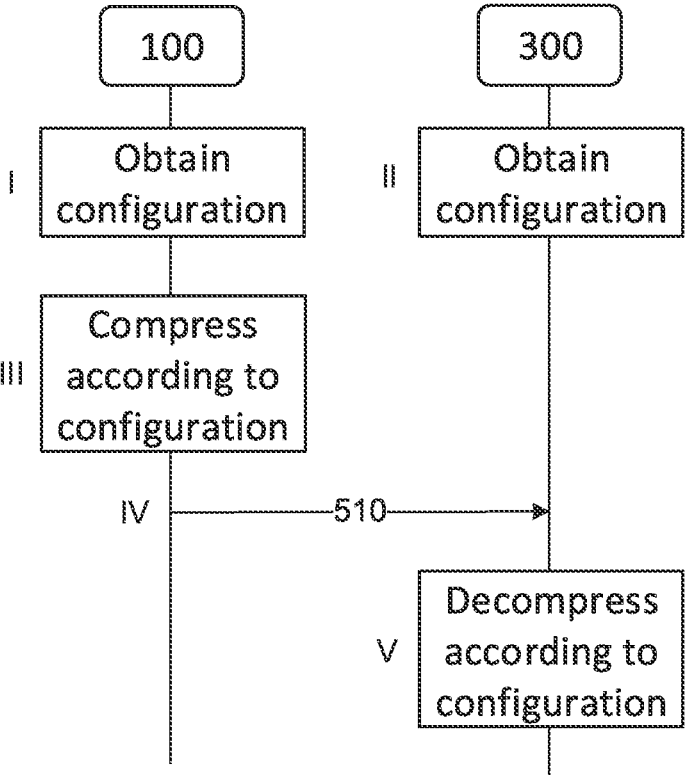
FIG. 6 shows sidelink communication between a first client device and a second client device according to an embodiment of the invention.

FIG. 6 shows sidelink communication between the first client device 100 and the second client device 300 according to an embodiment of the invention. In step I in FIG. 6, the first client device 100 obtains a configuration for a compression profile. The configuration for the compression profile comprises at least one of: a V2X layer header configuration, a network layer header configuration, or a transport layer header configuration. The configuration for the compression profile defines configured values of non-IP header fields in the at least one of V2X layer header configuration, network layer header configuration, or transport layer header configuration. The configured values may be used to identify non-IP headers which can be removed at the transmitter side and to reconstruct removed non-IP headers at the receiver side.

Table 1 below shows a non-limiting example of a configuration for a compression profile for the EU protocol stack, and table 2 shows a non-limiting example of a configuration for a compression profile for the US protocol stack.

TABLE 1

| Header | Sub-header | Field | Configured value for compression at a transmitter | Re-constructed value at a receiver | Note |
|---|---|---|---|---|---|
| V2X layer header (4B) | — | Type | 2 | 2 | Indicating 'Non-IP based V2X message' |
| | | Length | — | Length of the payload | Receiver calculating and setting the payload length |
| | | V2X message family | 3 | 3 | Indicating 'ETSI-ITS' |

TABLE 1-continued

| Header | Sub-header | Field | Configured value for compression at a transmitter | Re-constructed value at a receiver | Note |
|---|---|---|---|---|---|
| GeoNetworking Header (SHB, 40B) | Basic | Version | Latest version | Latest version | The value of the latest version can be pre-configured |
| | | NH | 1 | 1 | The next header is 'Common header' |
| | | LT | — | Non-zero any value | LifeTime bit is used for multi-hop tx. |
| | | RHL | — | 0 | Remaining Hop Limit is used for multi-hop tx. |
| | Common | NH | 2 | 2 | The next header is 'BTP-B' |
| | | HT and HST | 5 and 0 | 5 and 0 | Single Hop Broadcast (SHB) |
| | | TC | — | Any | Traffic class is used for ITS G-5 |
| | | Flags | — | 0 or 1 | Indicating whether ITS-S is stationary or mobile |
| | | PL | — | Length of the payload | Receiver calculating and setting the payload length |
| | | MHL | 1 | 1 | Maximum hop limit is used for multi-hop tx. |
| | Extended | SO PV | — | Any | Long Position Vector is used for multi-hop tx. |
| | | Media-dependent data | 0 | 0 | Set to 0 for non-ITS G-S |
| BTB Header (Type B, 4B) | — | Destination Port | 2001 (CAM) TBD (VAM) | 2001 (CAM) TBD (VAM) | Set to the value of the well-known port number |
| | | Destination Port Info | 0 | 0 | |

TABLE 2

| Header | Sub-header | Field | Configured value for compression at a transmitter | Re-constructed value at a receiver | Note |
|---|---|---|---|---|---|
| V2X layer header (4B) | — | Type | 2 | 2 | Indicating 'Non-IP based V2X message' |
| | | Length | — | Length of the payload | Receiver calculating and setting the payload length |
| | | V2X message family | 1 | 1 | Indicating 'IEEE 1609' |
| WSMP-N-Header (2B) | Version (1B) | Subtype | — | 0 | Subtype 0 is mandatory |
| | | WSMP-N-Header option indicator | — | 0 | 1 indicates presence of WAVE information Element Extension which is not the case in C-V2X so 0 shall be default. |
| | | WSMP Version | — | 3 | It is the default value used for the latest version of the IEEE Std., all higher values are reserved today. |
| | WAVE Information Element Extension (9B) | — | — | — | Not relevant for C-V2X access layer, and WSMP-N-Header option 0 turn it off, so it is not considered for compression. |
| | Transport Protocol ID (1B) | TPID | — | 0 | In an octet values from 0-5 are used in the current standard, where as only 0 is relevant for C-V2X and values 6-255 are reserved. |
| WSMP-T-Header (4B-6B) | — | Destination Port | PSID | PSID | Set to 0x20 for BSM, 0x27 for PSM |
| | | Wave Information Element Extension | — | — | Optional and not defined in the protocol |
| | | WSM Length | — | Length of the payload | Receiver calculating and setting the payload length |

The compression profile may comprise information about at least one of a protocol and a V2X message type. The protocol may be at least one of ETSI-ITS and IEEE 1609 and the V2X message type may be at least one of coordinate awareness message (CAM), vulnerable road user awareness message (VAM), basic safety message (BSM), and personal safety message (PSM). The configuration for the compression profile may hence apply to a specific protocol and/or message type, providing flexibility in the implementation of the compression such that compression may e.g. be performed only for specific types of messages. How the compression profile is indicated may be defined according to predefined rules and may e.g. be specified in the 3GPP specification. Examples of indication of compression profiles in the PDCP layer and the V2X layer are given in table 4, 5 and 7 below.

The first client device 100 may obtain the configuration for the compression profile from at least one of received policy delivery service signaling, received control signaling, and a memory or a universal subscriber identity module (USIM). Thus, the configuration for the compression profile may be received in signaling from another node such as policy delivery service signaling received from a policy control function (PCF) and/or control signaling received from a network access node such as e.g. a gNB. The signaling may be dedicated and/or broadcast signaling. The configuration for the compression profile may further be pre-configured or based on predefined rules in the first client device 100, e.g. obtained from a memory or a USIM of the first client device 100.

In step II in FIG. 6, the second client device 300 obtains a configuration for a compression profile. The configuration for the compression profile obtained by the second client device 300 corresponds to the configuration for the compression profile obtained by the first client device 100. The second client device 300 may obtain the configuration for the compression profile in the same way as described for the first client device 100, i.e. from at least one of received policy delivery service signaling, received control signaling, and a memory or a USIM.

Once obtained, the configuration for the compression profile may be updated using one or more of the methods used for obtaining the configuration for the compression profile. Thus, step I and II in FIG. 6 may be repeated by the first client device 100 and the second client device 300, respectively. Such an update may e.g. be triggered by a change in the configuration for the compression profile. Furthermore, step I and step II are separate from each other and may be performed at the same time or at different times.

In step III in FIG. 6, the first client device 100 compresses a broadcast sidelink packet according to the configuration for the compression profile. The compression comprises removing at least one non-IP header of the broadcast sidelink packet and is performed when the at least one non-IP header matches the configuration for the compression profile obtained in step I in FIG. 6. The at least one non-IP header may be any of a V2X layer header, a GeoNetworking header, a basic transport protocol (BTP) header and a WAVE short message protocol (WSMP) header.

To determine whether the at least one non-IP header of the broadcast sidelink packet matches the configuration for the compression profile, the first client device 100 may compare the at least one non-IP header against the obtained configuration for the compression profile, i.e. against at least one of the V2X layer header configuration, the network layer header configuration, or the transport layer header configuration. The first client device 100 may determine that the at least one non-IP header matches the configuration for the compression profile when the at least one non-IP header and the configuration for the compression profile have the same value. For example, when the configuration for the compression profile comprises the V2X layer header configuration, the network layer header configuration, and the transport layer header configuration, a match is determined if the non-IP headers of the broadcast sidelink packet comprises a V2X layer header, a network layer header, and a transport layer header. When the configuration for the compression profile comprises the network layer header configuration and the transport layer header configuration, a match is determined if the non-IP headers of the broadcast sidelink packet comprises a network layer header and a transport layer header.

In step IV in FIG. 6, the first client device 100 transmits the compressed broadcast sidelink packet 510 and an indication of the compression profile in a broadcast transmission. The second client device 300 receives the broadcast sidelink packet 510 and the indication of the compression profile associated with the broadcast sidelink packet 510. Based on the received configuration for the compression profile and indicated compression profile, the second client device 300 reconstructs at least one non-IP header of the broadcast sidelink packet 510 in step V in FIG. 6, i.e. the second client device 300 decompresses the received broadcast sidelink. The second client device 300 may hence obtain the original broadcast sidelink packet using information from the configuration for the compression profile and the indicated compression profile. This may include the second client device 300 obtaining configured values of non-IP header fields from the configuration for the compression profile using the indicated compression profile and reconstructing the non-IP headers based on the configured values. For example, when the indicated compression profile indicates the ETSI-ITS protocol, i.e. the EU protocol stack, the second client device 300 may use table 1 above to obtain configured values of non-IP header fields and reconstruct the non-IP headers based on the obtained values.

According to embodiments of the invention the first client device 100 may compress the broadcast sidelink packet in the PDCP layer. The previously described step III in FIG. 6 may hence be performed in the PDCP layer. For example, the first client device 100 may receive a broadcast sidelink packet including at least one non-IP header in the PDCP layer from an application layer. The client device 100 then compresses the broadcast sidelink packet in the PDCP layer, if the condition for header compression is met, i.e. if the at least one non-IP header matches the configuration for the compression profile.

In embodiments, the broadcast sidelink packet may be a V2X packet according to the EU protocol stack received from a V2X application layer. The V2X packet may include a V2X layer header, a GeoNetworking header and a BTP header, assumed to match the configuration of the compression profile. Table 3a below shows the format of such a V2X packet before compression and table 3b shows the format of the V2X packet after compression in the PDCP later.

TABLE 3a

| 3GPP Access | | | | Network | Transport | Application |
|---|---|---|---|---|---|---|
| MAC Header | RLC Header | PDCP Header | V2X Header | Geo-Net-working Header | BTP Header | Payload |

TABLE 3b

| 3GPP Access | | | Application |
|---|---|---|---|
| MAC Header | RLC Header | PDCP Header | Payload |

In embodiments where the broadcast sidelink packet is a V2X packet according to the US protocol stack. The V2X packet may include a V2X layer header and a WSAMP header which may be removed by the client device 100 in the PDCP layer, assuming that they match the configuration of the compression profile.

When the first client device 100 compresses the broadcast sidelink packet in the PDCP layer, the first client device 100 may indicate the compression profile in a PDCP header associated with the compressed broadcast sidelink packet 510. The compression profile may e.g. be indicated in the service data unit (SDU) type field of the PDCP header. When the compression profile is indicated using the SDU type field, the compression profile may e.g. be indicated using the three bits of the SDU type field as shown in table 4 or table 5. Table 4 shows an example of how EU and US compression profiles can be indicated without overlay and table 5 shows how EU and US compression profiles can be indicated with overlay.

TABLE 4

| Bit | Description |
| --- | --- |
| 000 | IP |
| 001 | Uncompressed Non-IP |
| 010 | Compressed Non-IP with Profile 1 (ETSI TS 103 300-3, VAM) |
| 011 | Compressed Non-IP with Profile 2 (ETSI EN 302 637-2, CAM) |
| 100 | Compressed Non-IP with Profile 3 (WSMP IEEE 1609.3, PSM) |
| 101 | Compressed Non-IP with Profile 4 (WSMP IEEE 1609.3, BSM) |

TABLE 5

| Bit | Description |
| --- | --- |
| 000 | IP |
| 001 | Uncompressed Non-IP |
| 010 | Compressed Non-IP with Profile 1 (ETSI TS 103 300-3, VAM/WSMP IEEE 1609.3, PSM) |
| 011 | Compressed Non-IP with Profile 2 (ETSI EN 302 637-2, CAM/WSMP IEEE 1609.3, BSM) |

The second client device 300 may hence in embodiments receive the indication of the compression profile in the PDCP header associated with the broadcast sidelink packet 510 and reconstruct the at least one non-IP header in the PDCP layer based on the indication of the compression profile and the obtained configuration of the compression profile.

According to embodiments of the invention the first client device 100 may compress the broadcast sidelink packet in the V2X layer. The previously described step III in FIG. 6 may hence be performed in the V2X layer. For example, the first client device 100 may receive a broadcast sidelink packet including at least one non-IP header in the V2X layer from an application layer. The first client device 100 then compresses the broadcast sidelink packet in the V2X layer, if the condition for header compression is met, i.e. if the at least one non-IP header matches the configuration for the compression profile.

In embodiments, the broadcast sidelink packet may be a V2X packet according to the EU protocol stack received from a V2X application layer. The V2X packet include a V2X layer header, a GeoNetworking header and a BTP header. The GeoNetworking header and the BTP header may be removed by the first client device 100 in the V2X layer, assuming that the GeoNetworking header and the BTP header match the configuration of the compression profile. Table 6a below shows the format of such a V2X packet before compression and table 6b shows the format of the V2X packet after compression in the V2X layer.

TABLE 6a

| 3GPP Access | | | | Network | Transport | Application |
| --- | --- | --- | --- | --- | --- | --- |
| MAC Header | RLC Header | PDCP Header | V2X Header | Geo-Networking Header | BTP Header | Payload |

TABLE 6b

| 3GPP Access | | | | Application |
| --- | --- | --- | --- | --- |
| MAC Header | RLC Header | PDCP Header | V2X Header | Payload |

In embodiments where the broadcast sidelink packet is a V2X packet according to the US protocol stack. The V2X packet may include a V2X layer header and a WSAMP header. The WSAMP header may be removed by the client device 100 in the V2X layer, assuming that the WSAMP header match the configuration of the compression profile.

When the first client device 100 compresses the broadcast sidelink packet in the V2X layer, the first client device 100 may indicate the compression profile in a V2X layer header associated with the compressed broadcast sidelink packet 510. The compression profile may e.g. be indicated in the type field of the V2X layer header. When the compression profile is indicated using the type field, the compression profile may e.g. be indicated using octet 1 of the V2X layer header as shown in table 7.

TABLE 7

| Bit | Description |
| --- | --- |
| 001 | IP based V2X message type |
| 010 | uncompressed non-IP based V2X message type |
| 011 | subscribe request |
| 100 | subscribe accept |
| 101 | subscribe reject |
| 110 | compressed non-IP based V2X message type with profile 1 (VAM, PSM) |
| 111 | compressed non-IP based V2X message type with profile 2 (CAM, BSM) |

When the second client device 300 receives the compressed broadcast sidelink packet and the indication of the compression profile in the V2X layer, the second client device 300 may reconstruct the at least one non-IP header in the V2X layer based on the indication of the compression profile and the obtained configuration of the compression profile.

According to embodiments of the invention the compression of broadcast sidelink packets can be activated and deactivated for the first client device 100 using control signals. The first client device 100 may be configured to at least one of start compress a broadcast sidelink packet according to a configuration for a compression profile after reception of an activation signal and stop compress a broadcast sidelink packet after reception of a deactivation signal. The activation and/or deactivation signal may be received from a network access node or another client device and the activation and/or deactivation signal may be transmitted using dedicated or broadcast signaling.

This provides flexibility and allows a mix of client devices supporting compression according to the invention and client devices not supporting such a compression to be coordinated. For example, compression according to the invention may be added as a client device capability and may be signaled to a network access node. The network access node may decide whether compression according to the invention is to be used based on the capability signaling from client devices in a cell or area. If all client devices currently in the cell or area support the compression according to the invention, then the network access node may transmit an activation signal to each client device in the cell. If some client devices do not support compression according to the invention, the network access node may transmit a deactivation signal to any client device for which such compression is active.

The first client device 100 and the second client device 300 in this disclosure includes but is not limited to: a UE such as a smart phone, a cellular phone, a cordless phone, a session initiation protocol (SIP) phone, a wireless local loop (WLL) station, a personal digital assistant (PDA), a hand-held device having a communication function, a computing device or another processing device connected to a wireless modem, an in-vehicle device, a wearable device, an inte-grated access and backhaul node (JAB) such as mobile car or equipment installed in a car, a drone, a device-to-device (D2D) device, a wireless camera, a mobile station, an access terminal, an user unit, a communication device, a station of wireless local access network (WLAN), a wireless enabled tablet computer, a laptop-embedded equipment, an universal serial bus (USB) dongle, a wireless customer-premises equipment (CPE), and/or a chipset. In an Internet of things (IOT) scenario, the first client device 100 and the second client device 300 may represent a machine or another device or chipset which performs communication with another wireless device and/or a network equipment.

The UE may further be referred to as a mobile telephone, a cellular telephone, a computer tablet or laptop with wire-less capability. The UE in this context may e.g. be portable, pocket-storable, hand-held, computer-comprised, or vehicle-mounted mobile device, enabled to communicate voice and/or data, via the radio access network, with another entity, such as another receiver or a server. The UE can be a station (STA), which is any device that contains an IEEE 802.11-conformant media access control (MAC) and physi-cal layer (PHY) interface to the wireless medium (WM). The UE may also be configured for communication in 3GPP related LTE and LTE-Advanced, in WiMAX and its evolu-tion, and in fifth generation wireless technologies, such as NR.

A network access node in this disclosure includes but is not limited to: a NodeB in wideband code division multiple access (WCDMA) system, an evolutional Node B (eNB) or an evolved NodeB (eNodeB) in LTE systems, or a relay node or an access port, or an in-vehicle device, a wearable device, or a gNB in the fifth generation (5G) networks. Further, the network access node herein may be denoted as a radio network access node, an access network access node, an access port, or a base station, e.g. a radio base station (RBS), which in some networks may be referred to as transmitter, "gNB", "gNodeB", "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a station (STA), which is any device that contains an IEEE 802.11-conformant MAC and PHY interface to the wireless medium. The radio network access node may also be a base station corresponding to the 5G wireless systems.

Furthermore, any method according to embodiments of the invention may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Eras-able PROM), or a hard disk drive.

Moreover, it is realized by the skilled person that embodi-ments of the first client device 100 and the second client device 300 comprise the necessary communication capabili-ties in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, deci-sion units, selecting units, switches, interleavers, de-inter-leavers, modulators, demodulators, inputs, outputs, anten-nas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the first client device 100 and the second client device 300 comprise, e.g., one or more instances of a Central Processing Unit (CPU), a processing unit, a processing circuit, a processor, an Application Spe-cific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

What is claimed is:

1. A first client device, comprising:
at least one processor; and
a non-transitory computer readable storage medium stor-ing a program that is executable by the at least one processor, the program including instructions to:
obtain a configuration for a compression profile;
compress a broadcast sidelink packet according to the configuration for the compression profile by remov-ing at least one non-internet protocol (IP) header of the broadcast sidelink packet when the at least one non-IP header matches the configuration for the compression profile; and
broadcast the compressed broadcast sidelink packet and an indication of the compression profile.

2. The first client device according to claim 1, wherein the configuration for the compression profile comprises at least one of: a vehicle-to-everything (V2X) layer header configu-ration, a network layer header configuration, or a transport layer header configuration.

3. The first client device according to claim 1, wherein the at least one non-IP header matches the configuration for the compression profile when the at least one non-IP header and the configuration for the compression profile have a same value.

4. The first client device according to claim 1, wherein the program further includes instructions to:
compress the broadcast sidelink packet in a packet data convergence protocol (PDCP) layer; and
indicate the compression profile in a PDCP header associated with the compressed broadcast sidelink packet.

5. The first client device according to claim 1, wherein the program further includes instructions to:
compress the broadcast sidelink packet in a vehicle-to-everything (V2X) layer; and
indicate the compression profile in a V2X layer header associated with the compressed broadcast sidelink packet.

6. The first client device according to claim 1, wherein the at least one non-IP header is a vehicle-to-everything (V2X) layer header, a GeoNetworking header, a basic transport protocol (BTP) header, or a WAVE short message protocol (WSMP) header.

7. The first client device according to claim 1, wherein the compression profile comprises information about at least one of a protocol or a vehicle-to-everything (V2X) message type.

8. The first client device according to claim 7, wherein:
the protocol is at least one of European Telecommunications Standards Institute-Intelligent Transport Systems (ETSI-ITS) or Institute of Electrical and Electronics Engineers (IEEE) 1609; and
the V2X message type is at least one of a coordinate awareness message (CAM), a vulnerable road user awareness message (VAM), a basic safety message (BSM), or a personal safety message (PSM).

9. The first client device according to claim 1, wherein obtaining the configuration for the compression profile comprises at least one of:
obtaining the configuration for the compression profile from received policy delivery service signaling;
obtaining the configuration for the compression profile from received control signaling; or
obtaining the configuration for the compression profile from a memory or a universal subscriber identity module (USIM).

10. The first client device according to claim 1, wherein the program further includes instructions to:
start to compress another broadcast sidelink packet according to the configuration for the compression profile after reception of an activation signal; and
stop compressing the another broadcast sidelink packet after reception of a deactivation signal.

11. A second client device, comprising:
at least one processor; and
a non-transitory computer readable storage medium storing a program that is executable by the at least one processor, the program including instructions to:
obtain a configuration for a compression profile;
receive a broadcast sidelink packet and an indication of the compression profile associated with the broadcast sidelink packet, the indication of the compression profile being carried in a header associated with the broadcast sidelink packet; and
reconstruct at least one non-internet protocol (IP) header of the broadcast sidelink packet according to the configuration for the compression profile and the indicated compression profile.

12. The second client device according to claim 11, wherein the configuration for the compression profile comprises at least one of: a vehicle-to-everything (V2X) layer header configuration, a network layer header configuration, or a transport layer header configuration.

13. The second client device according to claim 11, wherein the program includes instructions to:
receive the indication of the compression profile in a packet data convergence protocol (PDCP) header associated with the broadcast sidelink packet; and
reconstruct the at least one non-IP header in a PDCP layer.

14. The second client device according to claim 11, wherein the program includes instructions to:
receive the indication of the compression profile in a vehicle-to-everything (V2X) layer header; and
reconstruct the at least one non-IP header in a V2X layer.

15. The second client device according to claim 11, wherein the at least one non-IP header is a vehicle-to-everything (V2X) layer header, a GeoNetworking header, a basic transport protocol (BTP) header, or a WAVE short message protocol (WSMP) header.

16. The second client device according to claim 11, wherein the indicated compression profile comprises information about at least one of a protocol or a vehicle-to-everything (V2X) message type.

17. The second client device according to claim 16, wherein:
the protocol is at least one of European Telecommunications Standards Institute-Intelligent Transport Systems (ETSI-ITS) or Institute of Electrical and Electronics Engineers (IEEE) 1609; and
the V2X message type is at least one of a coordinate awareness message (CAM), a vulnerable road user awareness message (VAM), a basic safety message (BSM), or a personal safety message (PSM).

18. The second client device according to claim 11, wherein obtaining the configuration comprises at least one of:
obtaining the configuration for the compression profile from received policy delivery service signaling;
obtaining the configuration for the compression profile from received control signaling; or
obtaining the configuration for the compression profile from a memory or a universal subscriber identity module (USIM).

19. A method for a first client device, the method comprising
obtaining a configuration for a compression profile;
compressing a broadcast sidelink packet according to the configuration for the compression profile by removing at least one non-internet protocol (IP) header of the broadcast sidelink packet when the at least one non-IP header matches the configuration for the compression profile; and
broadcasting the compressed broadcast sidelink packet and an indication of the compression profile.

20. A method for a second client device, the method comprising
obtaining a configuration for a compression profile;
receiving a broadcast sidelink packet and an indication of the compression profile associated with the broadcast sidelink packet, the indication of the compression profile being carried in a header associated with the broadcast sidelink packet; and reconstructing at least one non-IP header of the broadcast sidelink packet according to the configuration for the compression profile and the indicated compression profile.

\* \* \* \* \*